Oct. 9, 1934.  R. F. MALLINA  1,976,505
VIBRATION DAMPING SYSTEM FOR PHONOGRAPHS
Filed Aug. 28, 1931  2 Sheets-Sheet 1
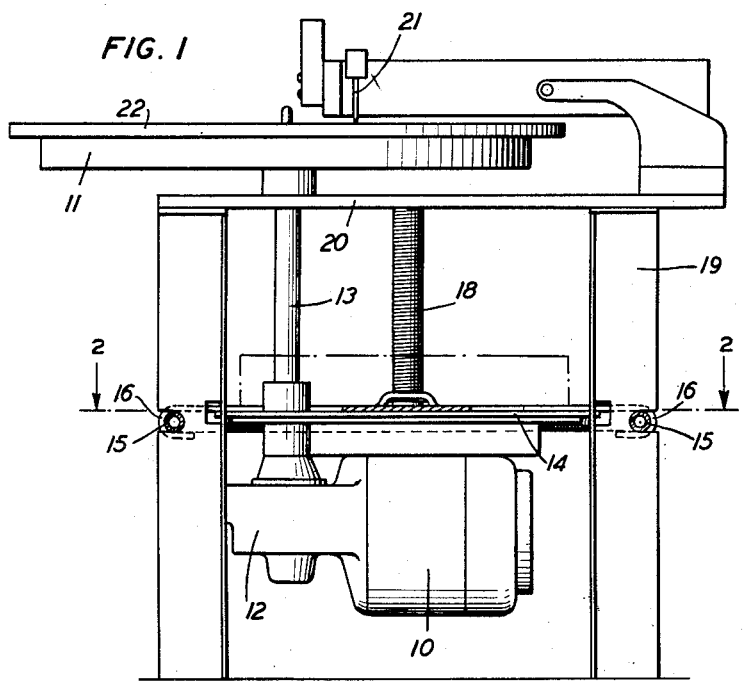
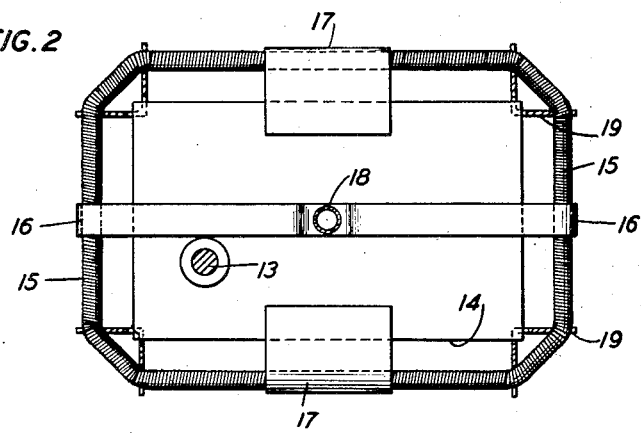
INVENTOR
R.F. MALLINA
BY
ATTORNEY Oct. 9, 1934.　　　　R. F. MALLINA　　　　1,976,505
VIBRATION DAMPING SYSTEM FOR PHONOGRAPHS
Filed Aug. 28, 1931　　　2 Sheets-Sheet 2

INVENTOR
R. F. MALLINA
BY
ATTORNEY

Patented Oct. 9, 1934

1,976,505

UNITED STATES PATENT OFFICE 1,976,505

VIBRATION DAMPING SYSTEM FOR PHONOGRAPHS

Rudolph F. Mallina, New York, N. Y., assignor to Bell Telephone Laboratories, Incorporated, New York, N. Y., a corporation of New York Application August 28, 1931, Serial No. 559,843

3 Claims. (Cl. 274—9)

This invention relates to vibration damping systems and particularly to the application of such systems to phonograph recording and reproducing machines.

In my copending application Serial No. 491,844, filed October 29, 1930, now Patent No. 1,945,558, dated February 6, 1934, I disclose a vibration damping system for a recording machine employing felt as the absorbing material wherein pads of this material are placed between the motor supports and the frame of the machine to absorb vibrations occurring therebetween and a cylindrical filter is inserted in the drive shaft between the motor and turntable to further remove undesirable vibrations particularly those of a torsional nature.

The object of this invention is to provide a metallic alternative of the above damping system which is adapted to absorb more effectively vibrations of large amplitude such as occur during the period when the motor of a machine is being accelerated or decelerated.

In carrying out this object, springs are used which are so located with respect to the members between which it is desired to remove vibrations that the resistance presented to the vibrations by the springs increases much more rapidly than the amplitude of the vibrations.

For a better understanding of this invention reference may be had to the accompanying drawings in which:

Fig. 1 is an elevation of a phonographic machine using springs of this nature for the motor mounting;

Fig. 2 is a plan view of the springs of the same machine;

Figure 5:
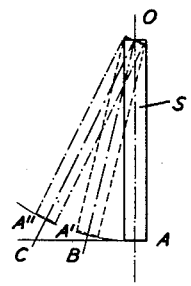
Fig. 5 is a diagram illustrating the principle of the action of the springs.

In Fig. 5, S is a helical spring with a given coefficient of elasticity shown in its normal length of A, A' and A''. Assuming two deflected positions of the spring B and C perpendicular to OA such that AC is twice AB, it is evident that the lengths OB and OC increase as the reciprocal of the sine of the angle of deflection and that the tension in the springs does not increase in proportion to the displacement in the direction AC but much more rapidly as is indicated by the increments of increase A'B and A''C in the length of the spring OA.

The motor mounting of Figs. 1 and 2 shows how the nonlinear stiffness of the springs just demonstrated can be utilized to absorb large vibrations. The motor 10 drives the turntable 11 through worm reduction gear 12 and shaft 13. A translating device 21 is shown engaging a disc 22 driven and supported by turntable 11. The motor is secured to a steel plate 14 which is suspended from a continuous spring 15 by hooks 16, 16 and 17, 17. A second spring 18 supports the entire weight of the motor and mounting and is secured to the mounting over the center of gravity of the supported mass. The angle irons 19 supporting the base plate 20 of the machine are notched to receive the continuous spring 15 in a close fit when the spring 18 is extended and carrying its full load.

The points of attachment of the motor mounting to the horizontal springs are so selected that the angle of deflection of each part of the spring on either side of the hook will be the same and hence the restoring forces of the parts will likewise be equal thus minimizing any tendency to rotate. For the arrangement shown the supporting hooks are placed over the midpoints of the springs to secure this effect. It is evident from the drawings that at least one spring would be deflected according to Fig. 5 for any type of vibration that might arise.

Figure 3:
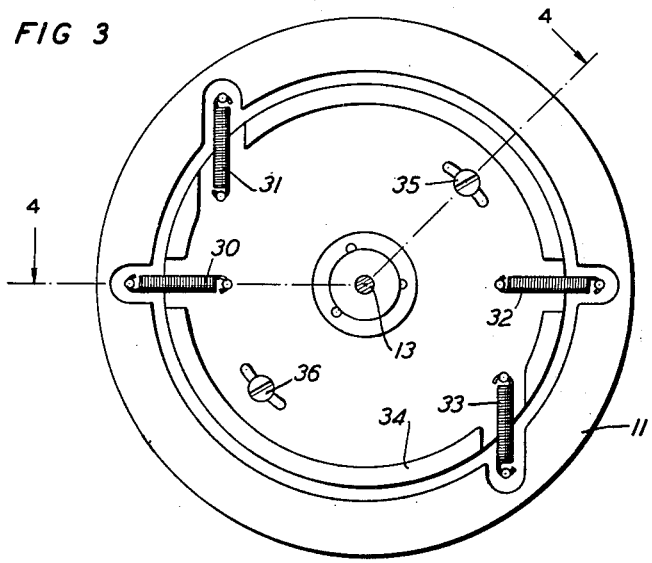
Figs. 3 and 4 are a plan view and elevation, respectively, of a turntable showing the adaptation of these springs to damping out torsional vibrations.
Figure 4:
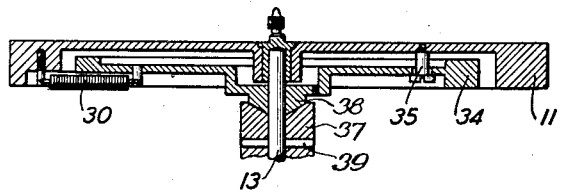

In the case of torsional vibrations Figs. 3 and 4 show how the springs may be incorporated in a turntable to smooth out irregularities in angular velocity resulting from imperfect gear teeth or other causes. The turntable 11 (shown inverted in Fig. 3) is not rigidly connected to the drive shaft 13 but is driven through springs 30, 31, 32 and 33 which are attached to a disc 34 secured to drive shaft 13. Pins 35 and 36 of the turntable 11 cooperate in slots in the disc 34 to take the load when it becomes too great for the springs. Further relief from excessive torque may be secured by means of the friction clutch 37, 38 through which disc 34 is driven. The driving member 37 of the clutch is secured to shaft 13 with a pin 39, while the driven member 38 is free to rotate about shaft 13 and is driven through the frictional contact between the conical surfaces of the clutch. Both turntable and disc are weighted at their peripheries to increase the inertia of the rotating mass according to an expedient commonly employed in such devices to reduce minor torsional vibrations.

The springs 30 and 32 are tensioned along a diameter of the turntable so that the driving force is applied approximately at right angles to their axes, again according to Fig. 5, offering little resistance to small vibrations, but becoming very stiff as the vibrations increase in amplitude. The springs 31 and 33 are tensioned at an angle to take care of the small vibrations and displacements occurring during constant speed operation and permitted by springs 30 and 32, but all four springs cooperate to eliminate the larger vibrations. One of the small displacements, for instance, which must be compensated for is caused by the constant force of friction between the stylus of the translating device 21 and its cooperating disc 22. In this case an initial equal and opposite force is supplied by the oblique springs 31 and 33 to bring the radial springs 30 and 32 back to their neutral positions.

The applications of the spring mounting shown in the accompanying drawings are but a few of the possible uses to which this type of vibration damping system can be put and this invention is not to be limited thereby but is to be determined by the scope of the appended claims.

What is claimed is:

1. A torsional vibration absorbing turntable comprising a rotatable record support, a concentric rotating member, a plurality of radially disposed springs connecting the member and record support to impart a driving force thereto which varies non-linearly with the angular displacement between the member and record support and a plurality of springs connecting the member and record support to compensate for small angular displacements between the member and record support during constant speed operation, each of said last mentioned springs being disposed obliquely to a radius of the rotating member passing through the point of attachment of the springs to the rotating member.

2. In a phonograph machine equipped with suitable driving means, a torsional vibration absorbing turntable comprising a rotatable record support, a concentric rotating member, a friction clutch between the member and driving means wherein excessive driving force impulses are absorbed, a pair of radially disposed springs connecting the member and record support to impart a driving force thereto which varies non-linearly with the angular displacement between the member and record support, a pair of springs connecting the member and record support to compensate for small angular displacements between the member and record support, each of said last mentioned springs being disposed obliquely to a radius of the rotating member passing through the point of attachment of the springs to the rotating member, and stop means for limiting the angular displacement between the member and support.

3. In a phonograph machine, a turntable, an intermediate rotating member, and connecting means between the turntable and rotating member, said connecting means comprising radially disposed springs in tension and other resilient means for maintaining the springs in a radial position when the turntable is operating at constant speed.

RUDOLPH F. MALLINA.